United States Patent
Ueta et al.

(10) Patent No.: US 7,474,476 B2
(45) Date of Patent: Jan. 6, 2009

(54) OPTICAL LENS, COMPOUND LENS AND METHOD FOR PRODUCING THE SAME, AS WELL AS CEMENTED LENS AND METHOD FOR PRODUCING THE SAME

(75) Inventors: Yutaka Ueta, Yao (JP); Youhei Nakagawa, Neyagawa (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 11/962,260

(22) Filed: Dec. 21, 2007

(65) Prior Publication Data

US 2008/0151362 A1    Jun. 26, 2008

(30) Foreign Application Priority Data

Dec. 22, 2006    (JP) ............................. 2006-346053

(51) Int. Cl.
G02B 3/08    (2006.01)
G02B 13/18    (2006.01)
G02B 3/02    (2006.01)

(52) U.S. Cl. ....................................... 359/741; 359/717
(58) Field of Classification Search ................. 359/620, 359/646, 717, 736, 796, 741, 742
See application file for complete search history.

(56) References Cited

FOREIGN PATENT DOCUMENTS

| JP | 7-117143 A | 5/1995 |
|---|---|---|
| JP | 2002-144203 A | 5/2002 |
| JP | 2002-286987 A | 10/2002 |
| JP | 2005-62432 A | 3/2005 |

Primary Examiner—Alicia M Harrington
(74) Attorney, Agent, or Firm—Westerman, Hattori, Daniels & Adrian, LLP.

(57) ABSTRACT

An optical lens includes a lens effective portion, an inclined portion and a flange portion. The lens effective portion has, on a first side, a lens face with a small radius of curvature and also has, on a second side, a lens face with a large radius of curvature. The inclined portion has, on the first side, an inclined face inclined outwardly from the first side to the second side. The flange portion has, on the second side, a reference face protruding longer than the lens face with the large radius of curvature on the second side. Thus, it is possible to obtain an optical lens which is less susceptible to deformation or chipping and suppresses transmission eccentricity, a compound lens and a method for producing the same, as well as a cemented lens and a method for producing the same.

6 Claims, 12 Drawing Sheets

OPTICAL LENS, COMPOUND LENS AND METHOD FOR PRODUCING THE SAME, AS WELL AS CEMENTED LENS AND METHOD FOR PRODUCING THE SAME

BACKGROUND OF THE INVENTION

1. Field of the Invention

The present invention relates to an optical lens, a compound lens and a method for producing the same, as well as a cemented lens and a method for producing the same.

2. Description of the Background Art

As an optical device becomes more sophisticated in functionality, recently, various lenses have been required as a lens for use in an optical system of such an optical device (refer to Japanese Patent Laying Open Nos. 2002-144203, 07-117143, 2002-286987 and 2005-062432). In order to fill the need, a compound lens has been used as the lens. The compound lens has a configuration that a certain lens is cemented to a matrix lens. For example, the compound lens is an aspherical lens having a configuration that a resin lens is cemented to a surface of a spherical lens.

Figure 26:
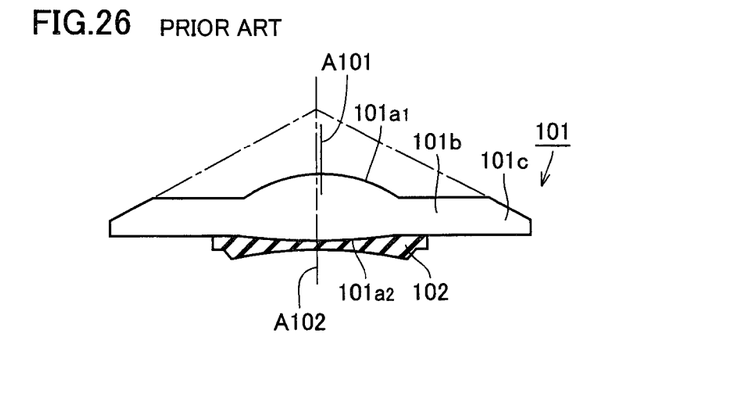
FIG. 26 is a schematic sectional view showing a configuration of a conventional compound lens.

FIG. 26 is a schematic sectional view showing a configuration of a conventional compound lens. With reference to FIG. 26, the compound lens includes a matrix lens 101 and a resin lens 102. Matrix lens 101 is, for example, a small-diameter lens having a thin outer peripheral edge. Matrix lens 101 includes a lens effective portion (an optical functional portion), a flange portion 101b and a chamfered portion 101c.

The lens effective portion has a lens face $101a_1$ formed on its front side and a lens face $101a_2$ formed on its rear side. Flange portion 101b is formed so as to extend from an outer periphery of the lens effective portion. Chamfered portion 110c is formed on an outer periphery end of flange portion 101b.

Resin lens 102 is cemented to lens face $101a_2$.

If chamfered portion 101c is formed at the outer peripheral edge of matrix lens 101, conventionally, there arises a problem that matrix lens 101 becomes deformed or chipped due to the thin outer peripheral edge.

In addition, when matrix lens 101 is produced by injection molding, an axis A102 of chamfered portion 101c is misaligned with an axis A101 of the lens effective portion. Hereinafter, description will be given of this drawback.

Figure 27:
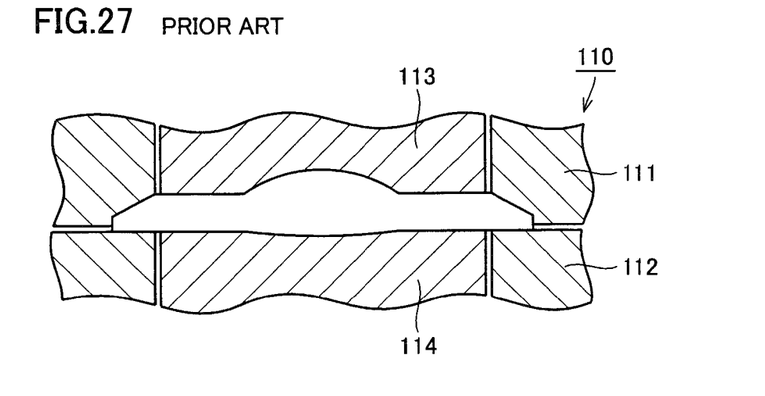
FIG. 27 is a sectional view schematically showing a configuration of a molding die used for producing the conventional compound lens by injection molding.

FIG. 27 is a schematic sectional view showing a configuration of a die used for producing matrix lens 101 by injection molding. With reference to FIG. 27, die 110 for injection molding includes a movable die 111, a fixed die 112, an insertion die 113 and an insertion die 114. A portion in the vicinity of an outer peripheral end of matrix lens 101 is molded by movable die 111 and fixed die 112 while the lens effective portion of matrix lens 101 is molded by insertion die 113 and insertion die 114.

The lens effective portion requires high accuracy. Therefore, a die used for producing the lens effective portion can be readily replaced with new one even when becoming deformed. In addition, insertion die 113 and insertion die 114 are separated from movable die 111 and fixed die 112, respectively, so as to facilitate replacement of insertion die 113 or 114.

However, insertion die 113 and insertion die 114 are separated from movable die 111 and fixed die 112, respectively, so that a clearance is created between insertion die 113 and movable die 111 and between insertion die 114 and fixed die 112. This clearance causes a disadvantage that insertion die 113 is displaced with respect to movable die 111 and insertion die 114 is displaced with respect to fixed die 112. In other words, insertion die 113 and insertion die 114 each used for molding the lens effective portion are displaced with respect to movable die 111 and fixed die 112 each used for molding the portion in the vicinity of chamfered portion 101c. As shown in FIG. 26, consequently, axis A102 of chamfered portion 101c is misaligned with axis A101 of the lens effective portion. This axial misalignment causes a problem of transmission eccentricity.

SUMMARY OF THE INVENTION

The present invention has been devised in view of the aforementioned problems. An object of the present invention is to provide an optical lens which is less susceptible to deformation or chipping and suppresses transmission eccentricity, a compound lens and a method for producing the same, as well as a cemented lens and a method for producing the same.

The optical lens according to the present invention includes a lens effective portion, an inclined portion located at an outer periphery of the lens effective portion, and a flange portion located at an outer periphery of the inclined portion. Herein, the lens effective portion has, on a first side, a first lens face with a first radius of curvature and also has, on a second side, one of a second lens face with no curvature and a second lens face with a second radius of curvature larger than the first radius of curvature. The inclined portion has, on the first side, an inclined face inclined outwardly from the first side to the second side. The flange portion has, on the second side, a reference face protruding longer than the second lens face on the second side.

In the optical lens according to the present invention, the flange portion is formed at the outer periphery of the inclined portion, so that a thickness of the flange portion can be made large. Thus, the optical lens becomes less susceptible to deformation or chipping.

In addition, the flange portion is formed at the outer periphery of the inclined portion. Therefore, the optical lens can be produced by injection molding in such a manner that the flange portion is molded by a fixed die and a movable die while the inclined portion and the lens effective portion are molded by insertion dies. Herein, even when the insertion dies are displaced with respect to the fixed die and the movable die, an axis of the inclined portion and an axis of the lens effective portion are still aligned with each other. In the alignment using the inclined portion, as a result, there occurs no transmission eccentricity due to misalignment of the axis of the inclined portion with the axis of the lens effective portion.

As for a lens, typically, as a radius of curvature is smaller, an ability to refract light enhances. Due to occurrence of axial misalignment, consequently, a lens with a small radius of curvature becomes larger in amount of transmission eccentricity than a lens with a large radius of curvature. In the present invention, both the inclined face and the first lens face with the small radius of curvature are formed on the first side. Thus, each of the first lens face with the small radius of curvature and the inclined face can be molded by an identical insertion die. As a result, it is possible to prevent an axis of the first lens face from being misaligned with the axis of the inclined face. Thus, there occurs no transmission eccentricity due to the axial misalignment. On the other hand, the second lens face with the large radius of curvature is formed on the second side. This large radius of curvature of the second lens face brings the following advantage. That is, even when an axis of the second lens face is misaligned with respect to the axis of the inclined face in such a manner that the insertion die used for molding the second side is displaced with respect to the insertion die used for molding the first side, the amount of transmission eccentricity can be suppressed to be small.

Moreover, the reference face of the flange portion protrudes longer than an effective diameter portion of the second lens face on the second side. As a result, even when the optical lens is slid in the alignment, the effective diameter portion of the second lens face can be prevented from coming into contact with a lens molding die. In addition, if the optical lens is placed with the reference face thereof directed downward, the effective diameter portion of the second lens face does not come into contact with a reception side of a placement unit. This improves handleability of the optical lens.

In the optical lens, preferably, the inclined portion is one of a conical face and a curved face.

The compound lens according to the present invention includes the aforementioned optical lens, and a resin lens cemented to the second lens face of the optical lens.

Thus, it is possible to obtain a lens which is less susceptible to deformation or chipping and which suppresses transmission eccentricity or corrects such transmission eccentricity by a resin lens even in a case of occurrence of the transmission eccentricity.

The cemented lens according to the present invention includes the aforementioned optical lens, and a lens cemented to the second side of the optical lens.

Thus, it is possible to obtain a lens which is less susceptible to deformation or chipping and which suppresses transmission eccentricity or corrects such transmission eccentricity by a lens even in a case of occurrence of the transmission eccentricity.

The method for producing the compound lens according to the present invention includes a step of adjusting the positions of the inclined portion and the lens holding unit by bringing a lens holding unit into contact with the inclined face of the optical lens such that the inclined portion of the optical lens and the lens holding unit become coaxial with each other, and a step of molding a resin material in such a manner that the optical lens presses the resin material placed in a lens molding die against the lens molding die in a state where respective positions of the inclined portion and the lens holding unit are adjusted, and cementing the resin lens made of the resin material to the second lens face of the optical lens.

In the method for producing the compound lens according to the present invention, the alignment can be effected in such a manner that the lens holding unit is brought into contact with the inclined face of the optical lens. Therefore, it is possible to prevent axial misalignment of the optical lens with the resin lens, and to suppress transmission eccentricity due to the axial misalignment.

The method for producing the cemented lens according to the present invention includes a step of adjusting the positions of the inclined portion and the lens holding unit by bringing a lens holding unit into contact with the inclined face of the optical lens such that the inclined portion of the optical lens and the lens holding unit become coaxial with each other, and a step of superimposing the optical lens on a lens placed on a lens placement unit to align the lens placement unit with the lens in a state where respective positions of the inclined portion and the lens holding unit are adjusted, and cementing the lens to the optical lens.

In the method for producing the cemented lens according to the present invention, the alignment can be effected in such a manner that the lens holding unit is brought into contact with the inclined face of the optical lens. Therefore, it is possible to prevent axial misalignment of the optical lens with the lens, and to suppress transmission eccentricity due to the axial misalignment.

According to the present invention, as described above, it is possible to obtain an optical lens which is less susceptible to deformation or chipping and suppresses transmission eccentricity, a compound lens and a method for producing the same, as well as a cemented lens and a method for producing the same.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

With reference to the drawings, hereinafter, description will be given of preferred embodiments of the present invention.

Figure 1:
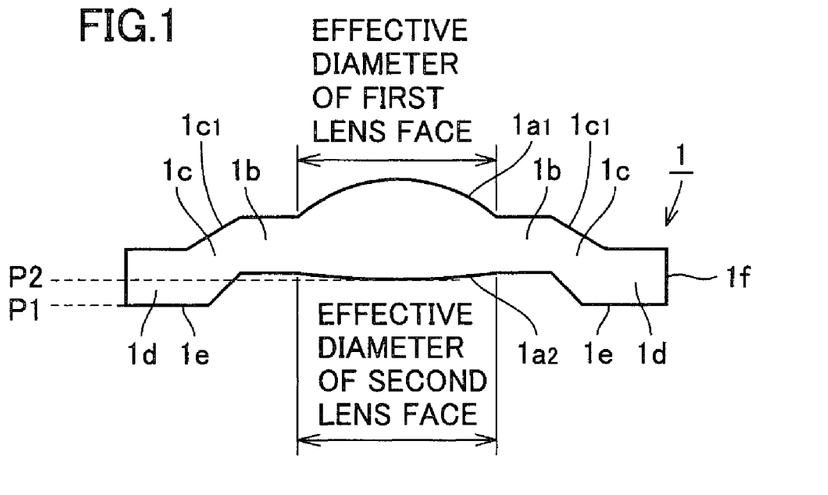
FIG. 1 is a sectional view schematically showing a configuration of an optical lens according to one embodiment of the present invention, and corresponds to a cross section taken along line I-I in FIG. 2.
Figure 2:
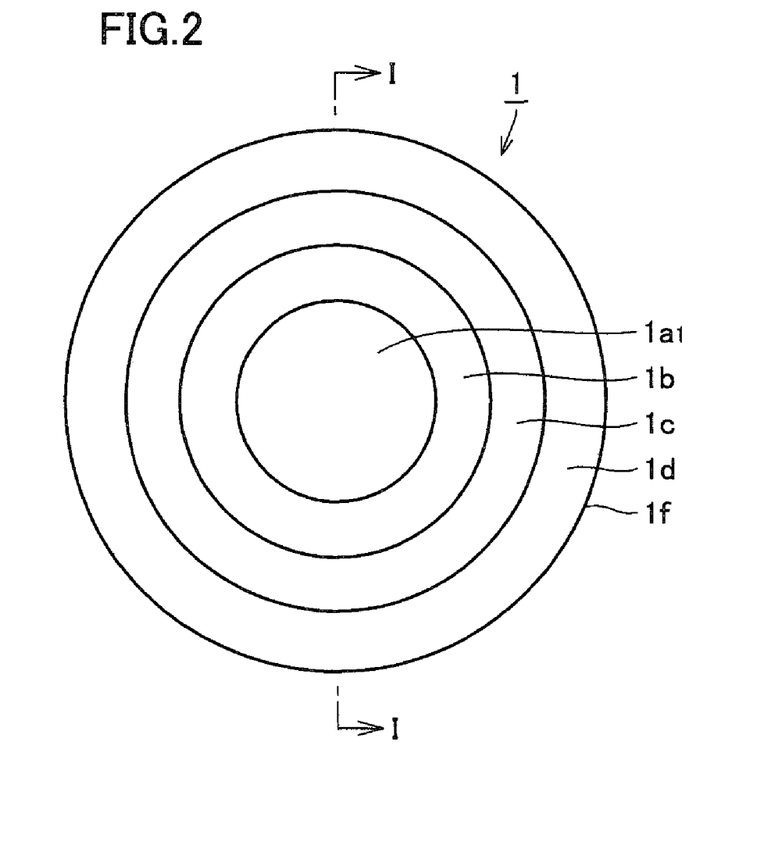
FIG. 2 is a plan view schematically showing the configuration of the optical lens according to the embodiment of the present invention.

With reference to FIGS. 1 and 2, an optical lens 1 according to one embodiment of the present invention is made of a plastic material or a glass material, for example. Optical lens 1 includes a lens effective portion (an optical functional portion), a flat portion 1b located at an outer periphery of the lens effective portion, an inclined portion 1c located at an outer periphery of flat portion 1b, and a flange portion 1d located at an outer periphery of inclined portion 1c. The lens effective portion has, on a first side (an upper side in FIG. 1), a first lens face $1a_1$ with a first radius of curvature and also has, on a second side (a lower side in FIG. 1), a second lens face $1a_2$ with a second radius of curvature larger than the first radius of curvature. Herein, second lens face $1a_2$ may have no curvature. In the embodiment, each of first lens face $1a_1$ and second lens face $1a_2$ forms a convex lens, for example. Therefore, the lens effective portion forms a double convex lens.

Flat portion 1b is formed so as to extend in an outer circumferential direction from the outer peripheral end of the lens effective portion. Inclined portion 1c has, on the first side, an inclined face $1c_1$ which extends outwardly from the outer peripheral end of flat portion 1b and is inclined outwardly from the first side to the second side. In the embodiment, inclined portion 1c also has, on the second side, an inclined face which is similar to inclined face $1c_1$, that is, which extends outwardly from the outer peripheral end of flat portion 1b and is inclined outwardly from the first side to the second side. Flange portion 1d is formed so as to extend far outwardly from the outer peripheral end of inclined portion 1c. Flange portion 1d has, on the second side, a reference face 1e which protrudes longer than second lens face $1a_2$ on the second side (the lower side in FIG. 1). As shown in FIG. 1, on the second side, more specifically, a position P1 corresponding to reference face 1e of flange portion 1d is located below a position P2 corresponding to a bottom of second lens face $1a_2$. Reference face 1e is perpendicular to axes of lens faces $1a_1$ and $1a_2$.

Next, description will be given of a method for producing optical lens 1 according to the embodiment.

Figure 3:
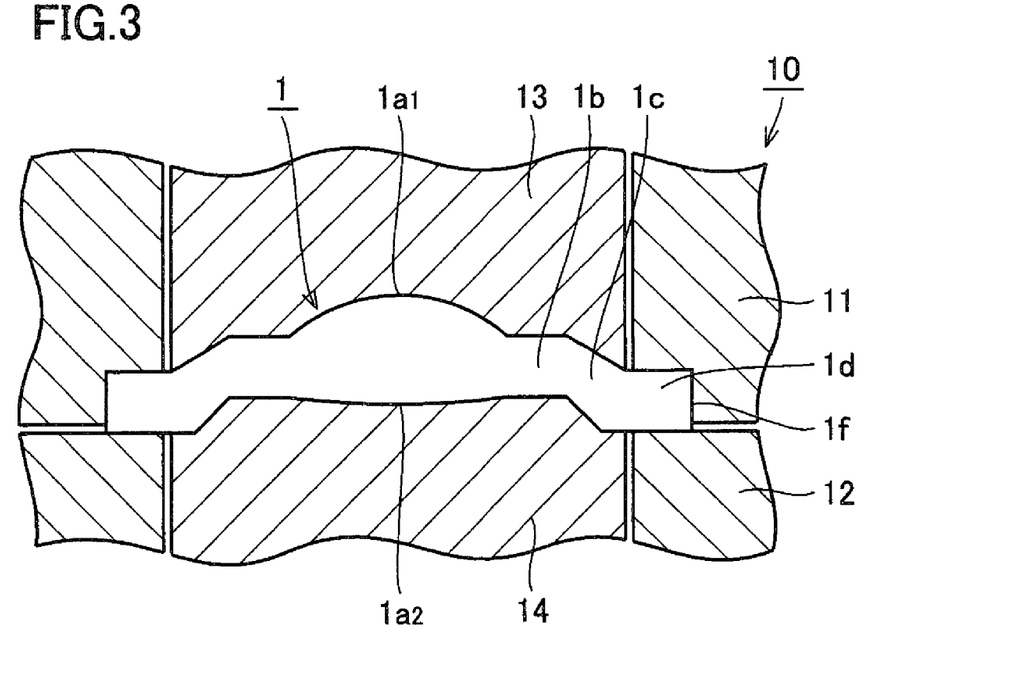
FIG. 3 is a sectional view schematically showing a method for producing the optical lens according to the embodiment of the present invention.

With reference to FIG. 3, optical lens 1 according to the embodiment is produced by injection molding, for example. A die 10 for injection molding includes a movable die 11, a fixed die 12, an insertion die 13 and an insertion die 14. Flange portion 1d of optical lens 1 is molded by movable die 11 and fixed die 12 while the lens effective portion, flat portion 1b and inclined portion 1c of optical lens 1 are molded by insertion die 13 and insertion die 14. Moreover, an outer peripheral end face 1f of optical lens 1 is molded by movable die 11.

Next, description will be given of functional advantages of optical lens 1 according to the embodiment.

In optical lens 1 according to the embodiment, flange portion 1d is formed at the outer periphery of inclined portion 1c, so that the thickness of flange portion 1d can be made large.

Therefore, optical lens 1 according to the embodiment becomes less susceptible to deformation or chipping.

In addition, flange portion 1d formed at the outer periphery of inclined portion 1c brings the following advantages. That is, in the case where optical lens 1 is produced by injection molding, flange portion 1d can be molded by movable die 11 and fixed die 12 while the lens effective portion, flat portion 1b and inclined portion 1c can be molded by insertion die 13 and insertion die 14. Therefore, even when insertion die 13 and insertion die 14 are displaced with respect to movable die 11 and fixed die 12, an axis of inclined portion 1c is still aligned with an axis of the lens effective portion. In other words, the axis of inclined portion 1c is not misaligned with the axis of the lens effective portion; therefore, inclined portion 1c can be utilized in alignment.

As for a lens, typically, as a radius of curvature is smaller, an ability to refract light enhances. Consequently, if axial misalignment occurs, a lens with a small radius of curvature becomes larger in amount of transmission eccentricity than a lens with a large radius of curvature.

In the embodiment, both inclined face $1c_1$ and first lens face $1a_1$ with the small radius of curvature are formed on the first side. Thus, each of first lens face $1a_1$ with the small radius of curvature and inclined face $1c_1$ can be molded by identical insertion die 13. As a result, it is possible to prevent an axis of first lens face $1a_1$ with the small radius of curvature from being misaligned with an axis of inclined face $1c_1$.

On the other hand, second lens face $1a_2$ with the large radius of curvature is formed on the second side. Consequently, if insertion die 14 used for molding the second side is displaced with respect to insertion die 13 used for molding the first side, an axis of second lens face $1a_2$ is misaligned with respect to the axis of inclined face $1c_1$ in some cases. However, the radius of curvature of second lens face $1a_2$ is large. Therefore, even when the aforementioned axial misalignment occurs, the amount of transmission eccentricity can be suppressed to be small.

Moreover, optical lens 1 according to the embodiment shown in FIG. 1 is typically held in a barrel (a lens tube) so as to be used as an outer diameter reference of a lens. Herein, the barrel holds outer peripheral end face 1f of optical lens 1. Consequently, if the axis of the lens effective portion is displaced with outer peripheral end face 1f of optical lens 1 serving as a reference, transmission eccentricity occurs due to the positional displacement.

As shown in FIG. 3, in the embodiment, outer peripheral end face 1f of optical lens 1 is molded by movable die 11. Therefore, a displacement amount of insertion die 13 with respect to movable die 11 corresponds to only the displacement amount of insertion die 13 with respect to movable die 11 whereas a displacement amount of insertion die 14 with respect to movable die 11 corresponds to a sum of a displacement amount of fixed die 12 with respect to movable die 11 and a displacement amount of insertion die 14 with respect to fixed die 12. As described above, the displacement amount of insertion die 13 with respect to movable die 11 can be made smaller than the displacement amount of insertion die 14 with respect to movable die 11. As a result, even when first lens face $1a_1$ with the small radius of curvature is molded by insertion die 13, the displacement amount of insertion die 13 is slight, so that the amount of transmission eccentricity can be suppressed to be small. Moreover, the displacement amount of insertion die 14 with respect to movable die 11 becomes large. However, the radius of curvature of second lens face $1a_2$ to be molded by insertion die 14 is large; therefore, the amount of transmission eccentricity based on the positional displacement can be suppressed to be small. As described above, the amount of transmission eccentricity can be suppressed to be small in each of first lens face $1a_1$ and second lens face $1a_2$.

In addition, reference face $1e$ of flange portion $1d$ protrudes longer than second lens face $1a_2$ on the second side. Therefore, second lens face $1a_2$ can be prevented from coming into contact with a lens molding die at a time when the optical lens is slid (to be described later) in alignment (see, e.g., FIG. 6).

Next, description will be given of a compound lens including aforementioned optical lens.

Figure 4:
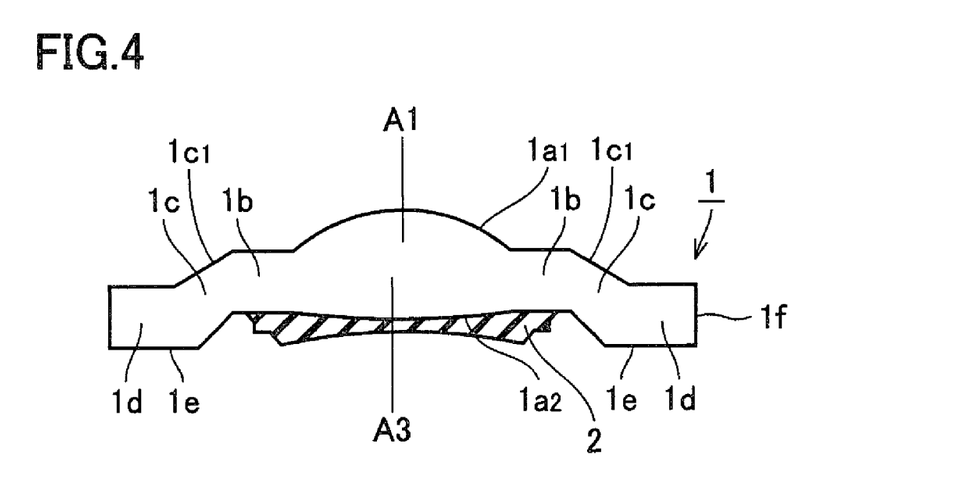
FIG. 4 is a sectional view schematically showing a configuration of a compound lens according to one embodiment of the present invention, the compound lens including the optical lens shown in FIGS. 1 and 2.

With reference to FIG. 4, the compound lens according to one embodiment of the present invention includes optical lens 1 shown in FIGS. 1 and 2, and a resin lens 2. Resin lens 2 is made of a photocurable resin, for example, and is cemented to second lens face $1a_2$ of optical lens 1. Resin lens 2 forms a concave lens, for example.

As for resin lens 2, preferably, the photocurable resin is a UV-curable resin. Moreover, a material for resin lens 2 is not particularly limited to the photocurable resin, and may be a thermosetting resin, that is, a material which can be cured after molding.

Next, description will be given of an apparatus and a method for producing the compound lens according to the embodiment.

Figure 5:
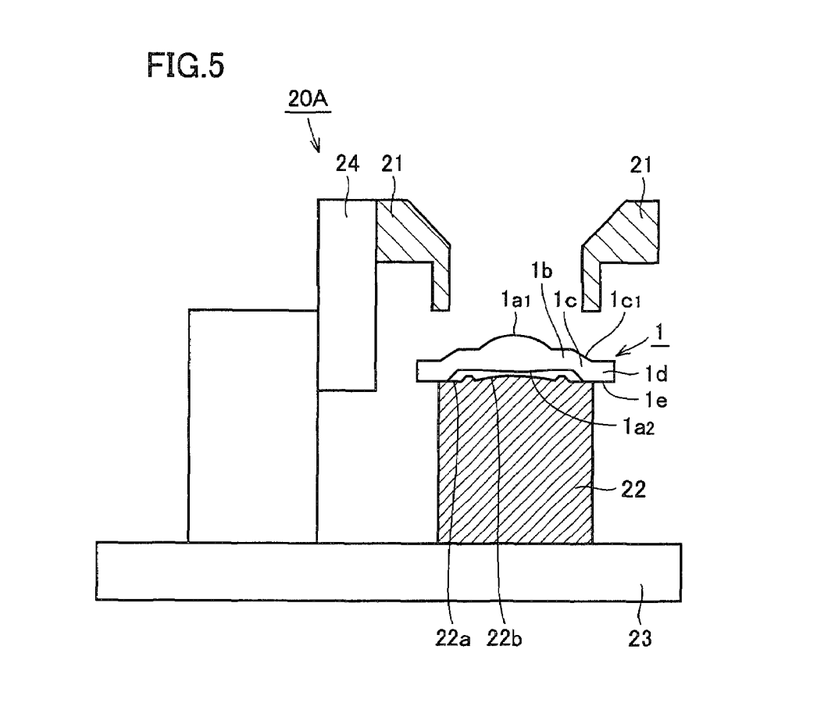
FIGS. 5 to 8 are schematic sectional views sequentially showing a method for producing the compound lens according to the embodiment of the present invention.

With reference to FIG. 5, a compound lens producing apparatus 20A includes a table 23, a lens molding die 22 disposed on table 23, a lens holding unit 21 for holding matrix lens 1 placed on lens molding die 22, and an ascent/descent unit 24 allowing lens holding unit 21 to move up/down. Lens holding unit 21 is formed into a barrel shape so as to come into contact with an entire circumference of inclined face $1c_1$ of matrix lens 1. Lens molding die 22 is used for molding a resin lens serving as another lens to be cemented to matrix lens 1, and has an upper face 22a provided with a recess portion 22b onto which a photocurable resin is injected (applied) as a predetermined resin.

Herein, compound lens producing apparatus 20A may further include a vibrator (not shown) interposed between table 23 and lens molding die 22 so as to vibrate lens molding die 22. In addition, ascent/descent unit 24 may be provided with an absorber (not shown) serving as a shock absorbing unit for gradually increasing a force to press, from above, lens holding unit 21 against matrix lens 1 placed on lens molding die 22. Preferably, a series of operations preformed by compound lens producing apparatus 20A, including respective operations of ascent/descent unit 24, the absorber and the vibrator may be controlled by a control unit (not shown).

In order to produce the compound lens in compound lens producing apparatus 20A, first, optical lens 1 shown in FIGS. 1 and 2 is placed as a matrix lens on upper face 22a of lens molding die 22. Herein, matrix lens 1 is placed on lens molding die 22 such that reference face $1e$ of matrix lens 1 comes into contact with upper face 22a of lens molding die 22. In this phase, an axis (not shown) of matrix lens 1 is not still aligned with a center axis (not shown) of lens molding die 22 (recess portion 22b) corresponding to an axis of a resin lens.

Figure 6:
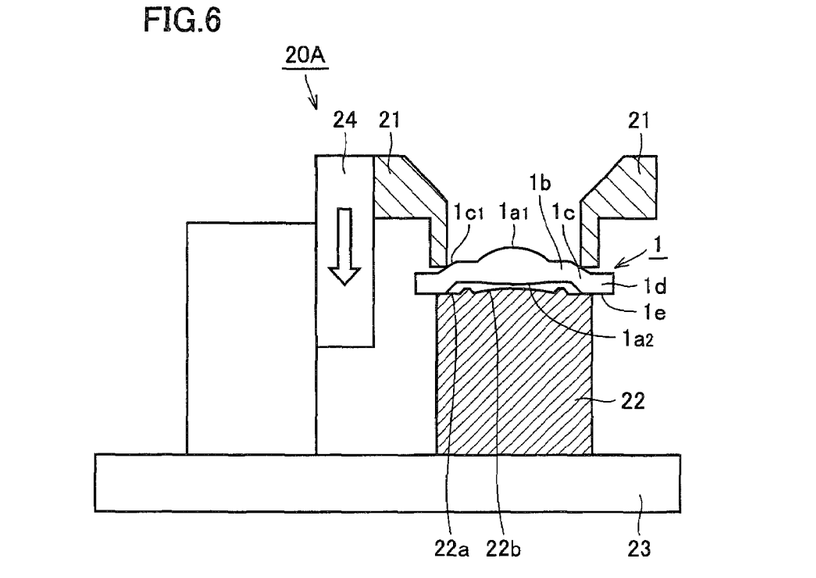

With reference to FIG. 6, when ascent/descent unit 24 descends, lens holding unit 21 gradually moves down toward matrix lens 1. Thus, lens holding unit 21 comes into contact with inclined face $1c_1$ of matrix lens 1. By adjustment of this contact state, the optical axis of matrix lens 1 is aligned with the center axis of lens molding die 22. The alignment is carried out as follows.

Figure 9A:
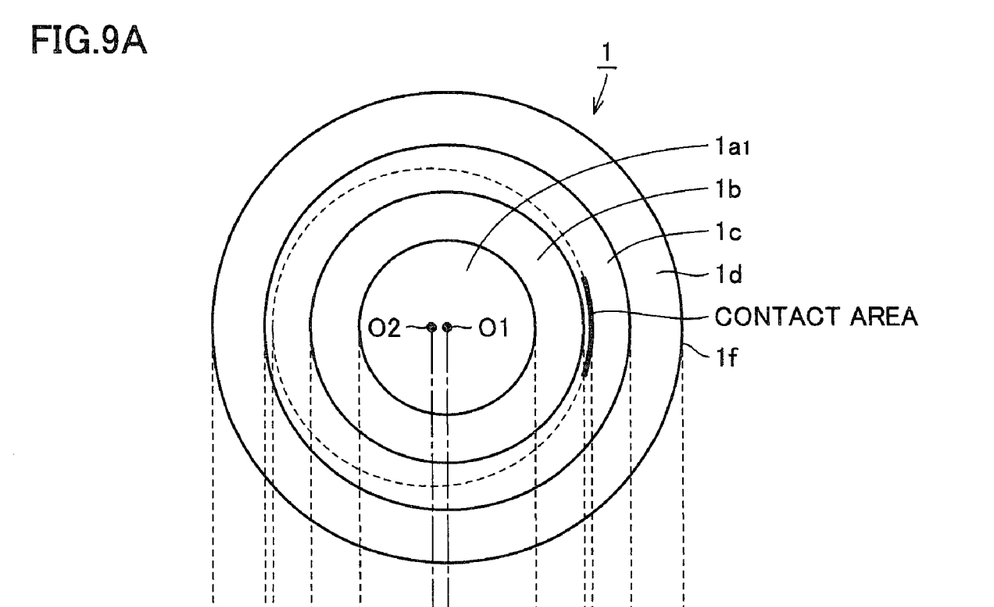
FIG. 9A and FIG. 9B are a plan view and a sectional view each showing a matrix lens in a state where an axis thereof is misaligned with a center axis of a lens holding unit.
Figure 9B:
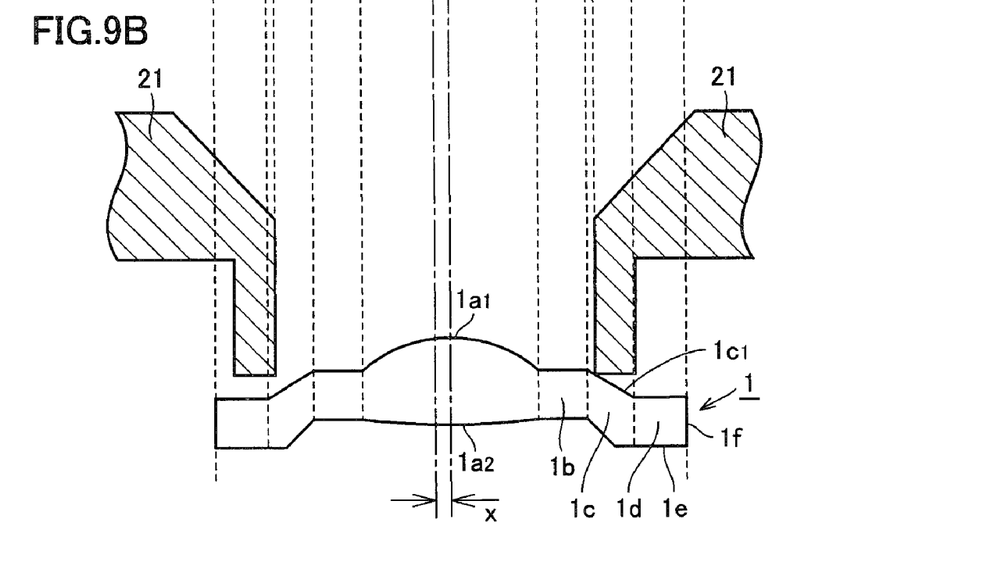

As shown in FIGS. 9A and 9B, first, it is assumed herein that axis O1 of matrix lens 1 is misaligned with respect to center axis O2 of lens holding unit 21 (recess portion 22b) by a distance x. Then, a tip end of lens holding unit 21, which has moved down, comes into contact with only inclined face $1c$, at a side where axis O1 is misaligned with respect to center axis O2. That is, a contact area of matrix lens 1 with lens holding unit 21 corresponds to only a portion shown by a bold line in FIG. 9A. The tip end of lens holding part 21 does not mostly come into contact with matrix lens 1 with a clearance created between lens holding part 21 and the surface of matrix lens 1.

Figure 10A:
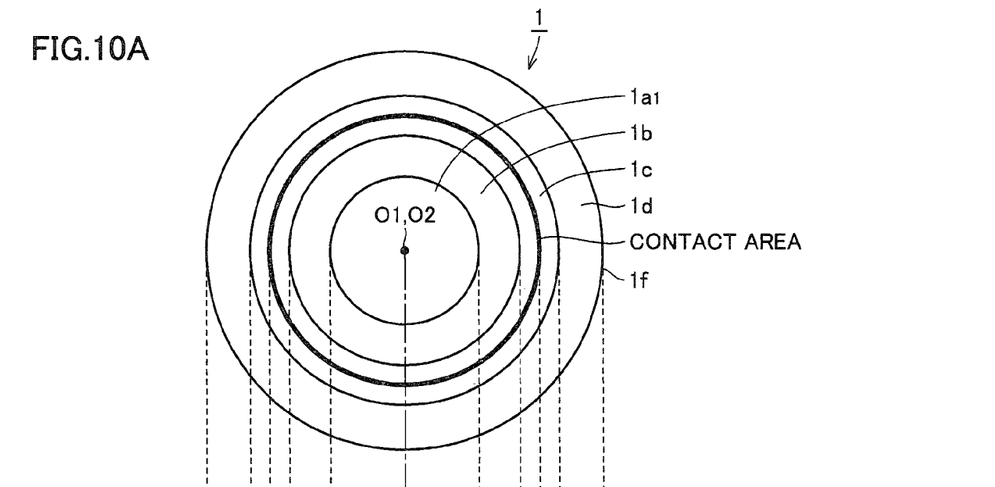
FIG. 10A and FIG. 10B are a plan view and a sectional view each showing the matrix lens in a state where the axis thereof is aligned with the center axis of the lens holding unit.
Figure 10B:
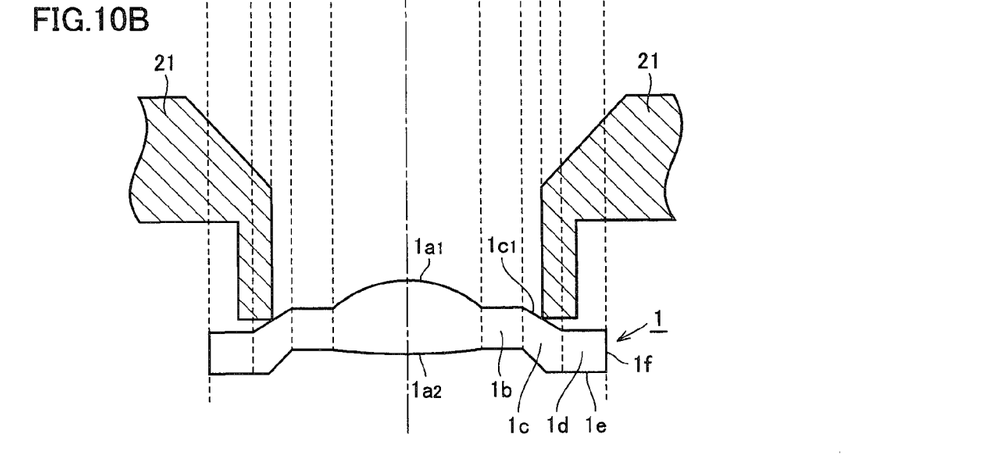

As shown in FIGS. 10A and 10B, then, positional adjustment is carried out in such a manner that matrix lens 1 is slid so as to allow the entire circumference of the tip end of lens holding unit 21 to come into contact with inclined face $1c_1$. Thus, axis O1 of matrix lens 1 becomes coaxial with center axis O2 of lens molding die 22, that is, axis O1 of matrix lens 1 is aligned with center axis O2 of lens molding die 22. This positional adjustment may be carried out manually, for example. Alternatively, this positional adjustment may be carried out automatically in such a manner that the vibrator vibrates lens molding die 22 while the absorber gradually increases the force to press lens holding unit 21 against matrix lens 1.

After the aforementioned alignment, a region surrounded with the tip end of lens holding unit 21 is evacuated in a state where the entire circumference of the tip end of lens holding unit 21 comes into contact with inclined face $1c_1$. Thus, lens holding unit 21 sucks matrix lens 1 under vacuum.

Figure 7:
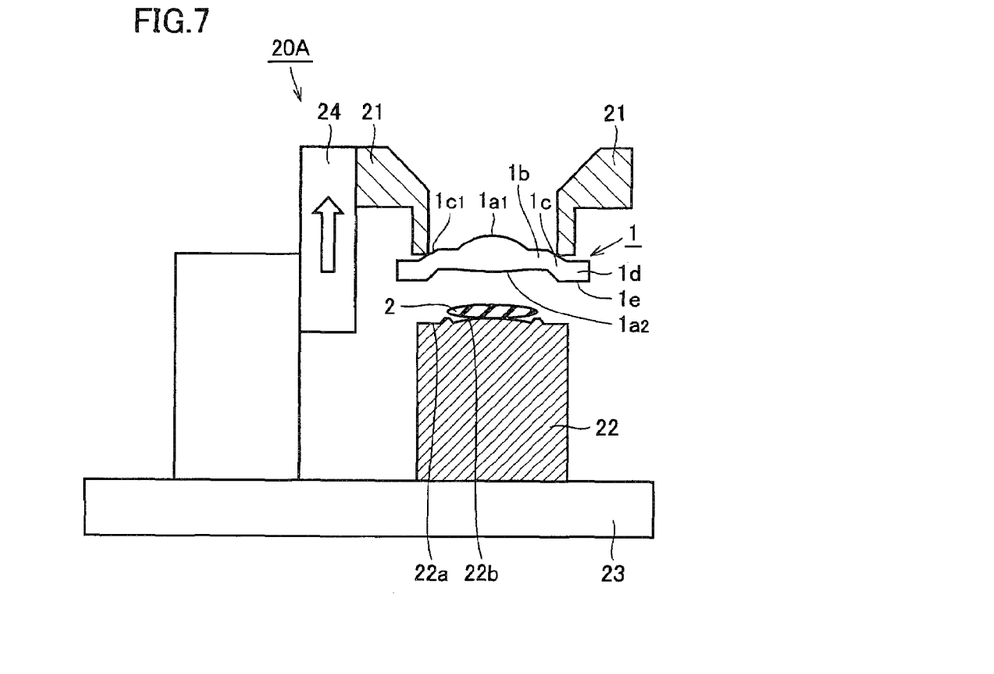

With reference to FIG. 7, when ascent/descent unit 24 ascends after the aforementioned suction under vacuum, matrix lens 1 is lifted up from lens molding die 22. Thereafter, photocurable resin 2 is applied onto recess portion 22b of lens molding die 22.

Figure 8:
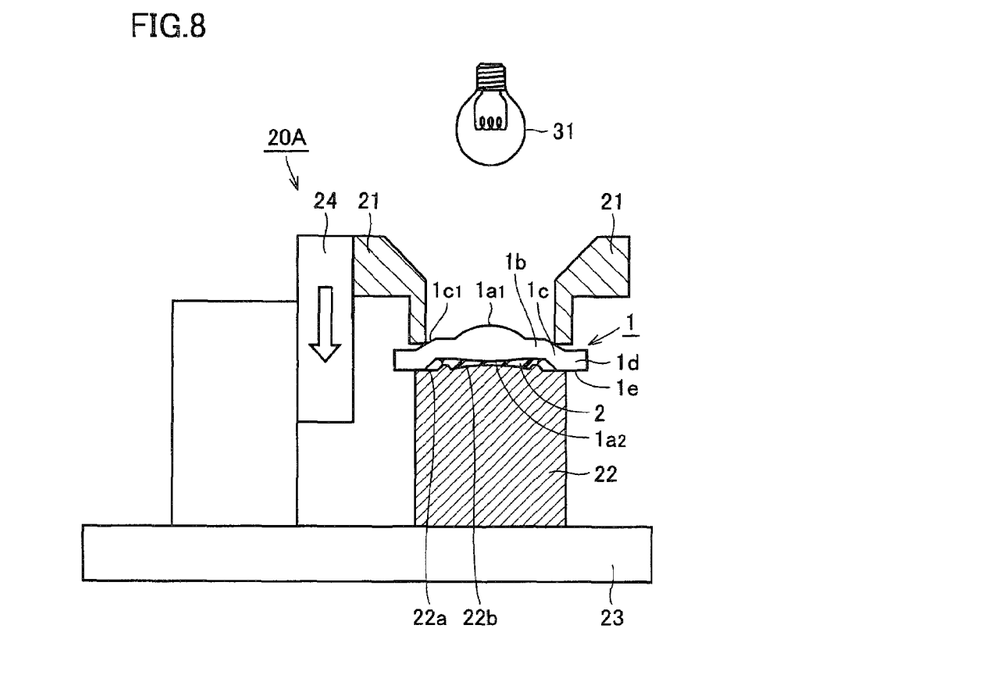

With reference to FIG. 8, when ascent/descent unit 24 descends, photocurable resin 2 applied onto lens molding die 22 is pressed against lens molding die 22 in the state where matrix lens 1 is subjected to the alignment. Thus, photocurable resin 2 is molded into a lens shape. Thereafter, a lamp 31 irradiates photocurable resin 2 with light to cure photocurable resin 2. Thus, resin lens 2 is cemented to second lens face $1a_2$ of matrix lens 1 to produce the compound lens including the matrix lens (optical lens) 1 and resin lens 2.

If photocurable resin 2 is a UV-curable resin, a UV lamp is used as lamp 31.

Next, description will be given of a cemented lens including optical lens 1 shown in FIGS. 1 and 2.

Figure 11:
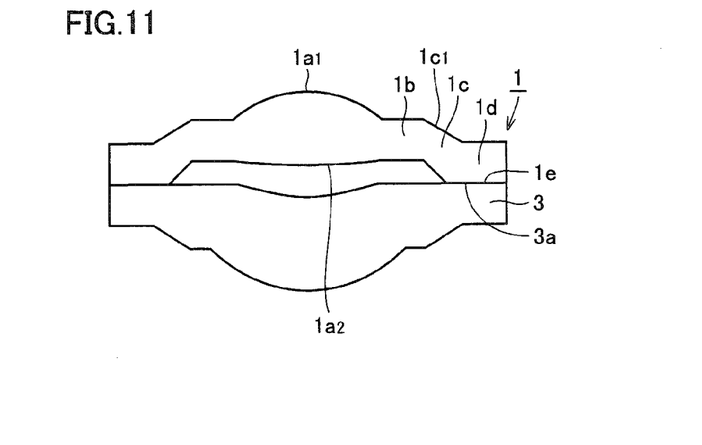
FIG. 11 is a sectional view schematically showing a configuration of a cemented lens according to one embodiment of the present invention, the cemented lens including the optical lens shown in FIGS. 1 and 2.

With reference to FIG. 11, the cemented lens according to one embodiment of the present invention includes optical lens 1 shown in FIGS. 1 and 2, and a lens 3 made of, for example, a plastic material or a glass material. Lens 3 is cemented to the second side of optical lens 1 through an adhesive. Lens 3 is a meniscus lens, for example.

Next, description will be given of an apparatus and a method for producing the cemented lens according to the embodiment.

Figure 12:
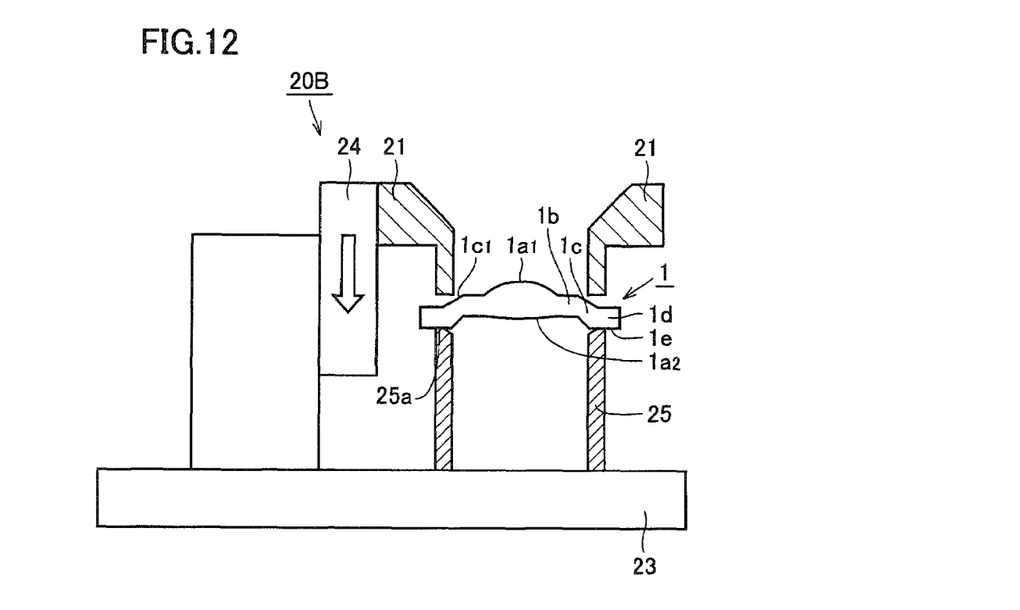
FIGS. 12 to 15 are schematic sectional views sequentially showing a method for producing the cemented lens according to the embodiment of the present invention.

With reference to FIG. 12, a cemented lens producing apparatus 20B is different from compound lens producing apparatus 20A shown in FIG. 5 in a point that a lens placement unit 25 is used instead of lens molding die 22. Lens placement unit 25 can perform alignment on lens 3 and can suck lens 3.

Cemented lens producing apparatus 20B is almost equal in configuration to compound lens producing apparatus 20A shown in FIG. 5 except the aforementioned configuration; therefore, identical members are denoted by identical reference numerals and repetitive description thereof will not be given here.

With reference to FIG. 12, in order to produce the cemented lens in cemented lens producing apparatus 20B, first, optical lens 1 shown in FIGS. 1 and 2 is placed as a matrix lens on an upper face 25a of lens placement unit 25. Herein, matrix lens 1 is placed on lens placement unit 25 such that reference face 1e of matrix lens 1 comes into contact with upper face 25a of lens placement unit 25. In this phase, the axis (not shown) of matrix lens 1 is not still aligned with a center axis (not shown) of lens placement unit 25 corresponding to an axis of lens 3.

Figure 13:
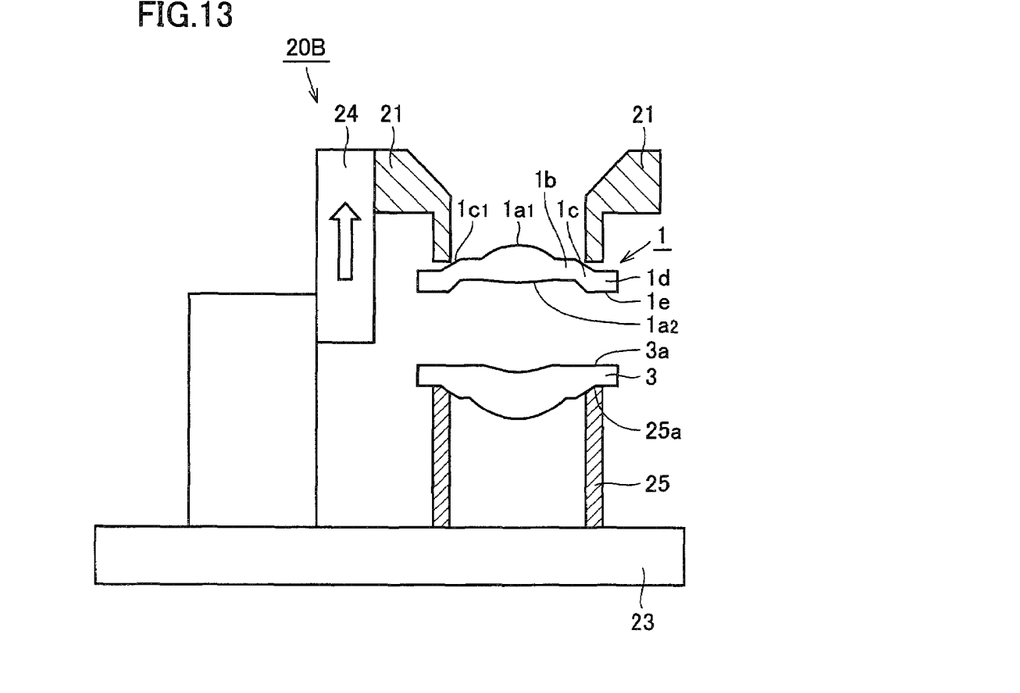

With reference to FIG. 13, when an ascent/descent unit 24 descends, a lens holding unit 21 gradually moves down toward matrix lens 1. Thus, lens holding unit 21 comes into contact with inclined face $1c_1$ of matrix lens 1. By adjustment of this contact state, the axis of matrix lens 1 becomes coaxial with a center axis of lens placement unit 25, that is, the axis of matrix lens 1 is aligned with the center axis of lens placement unit 25. This alignment is carried out as in the manner using compound lens producing apparatus 20A described with reference to FIG. 5.

After the aforementioned alignment, a region surrounded with a tip end of lens holding unit 21 is evacuated in a state where an entire circumference of the tip end of lens holding unit 21 comes into contact with inclined face $1c_1$. Thus, lens holding unit 21 sucks matrix lens 1 under vacuum.

When ascent/descent unit 24 ascends after the aforementioned suction under vacuum, matrix lens 1 is lifted up from lens placement unit 25. Thereafter, lens 3 is placed on upper face 25a of lens placement unit 25.

Figure 14:
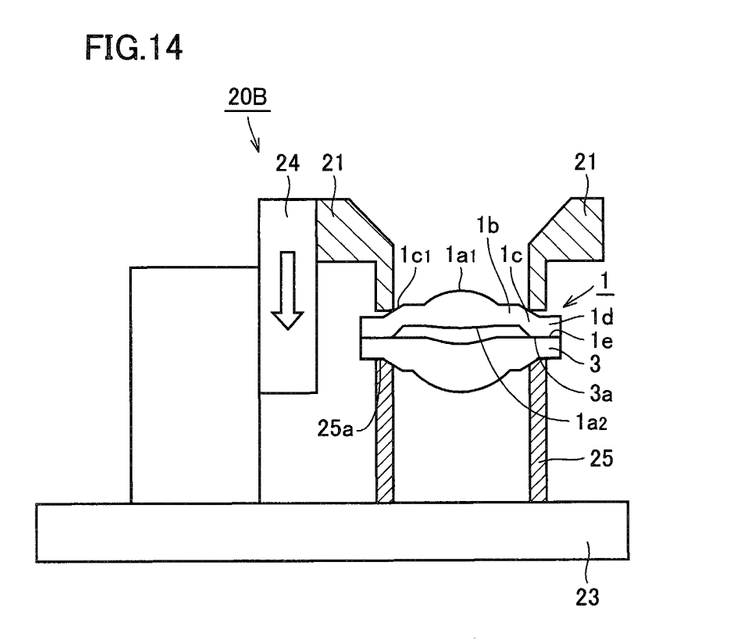

With reference to FIG. 14, when ascent/descent unit 24 descends, lens 3 placed on lens placement unit 25 is pressed against lens placement unit 25 in the state where matrix lens 1 is subjected to the alignment. Thus, a cemented face 3a of lens 3 becomes parallel with reference face 1e of matrix lens 1, and the position of lens 3 is restricted by lens placement unit 25, so that lens 3 is subjected to the alignment. That is, the axis (not shown) of lens 3 becomes coaxial with the center axis (not shown) of lens placement unit 25.

After the aforementioned alignment, a region surrounded with upper face 25a of lens placement unit 25 is evacuated in a state where the entire circumference of upper face 25a of lens placement unit 25 comes into contact with lens 3. Thus, lens placement unit 25 sucks lens 3 under vacuum.

Figure 15:
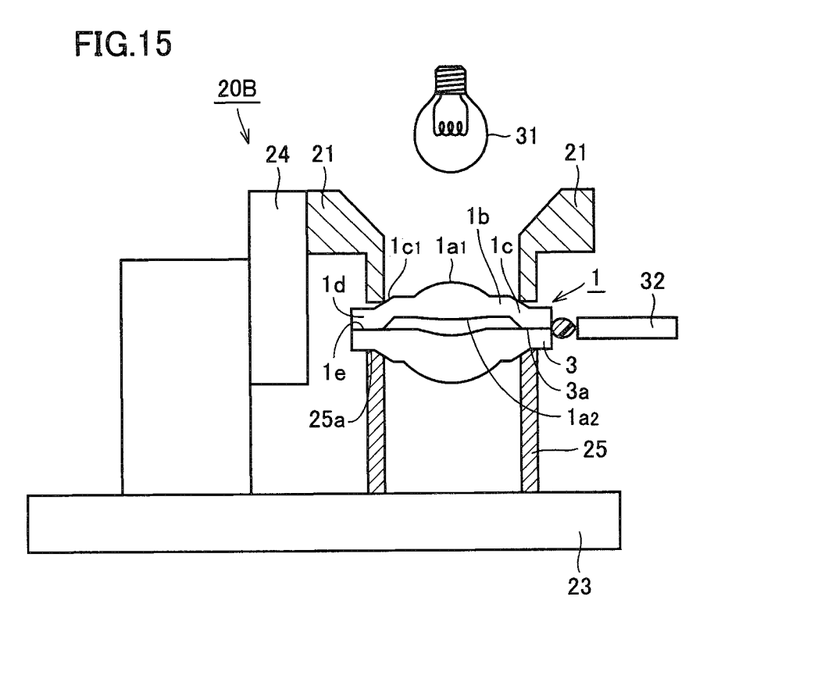

With reference to FIG. 15, an adhesive made of, for example, a photocurable resin is applied by a dispenser 32 to an interface between reference face 1e of matrix lens 1 and cemented face 3a of lens 3. Thereafter, a lamp 31 irradiates the adhesive with light to cure the adhesive. Thus, matrix lens 1 is cemented to lens 3 to produce the cemented lens including matrix lens (optical lens) 1 and lens 3.

As for the adhesive, preferably, the photocurable resin is a UV-curable resin. Moreover, a material for the adhesive is not particularly limited to the photocurable resin, and may be a thermosetting resin, that is, a material which can be cured after application. If the adhesive is made of the UV-curable resin, a UV lamp is used as lamp 31.

Next, description will be given of a reason for occurrence of transmission eccentricity in a case of using a double convex lens.

Figure 16:
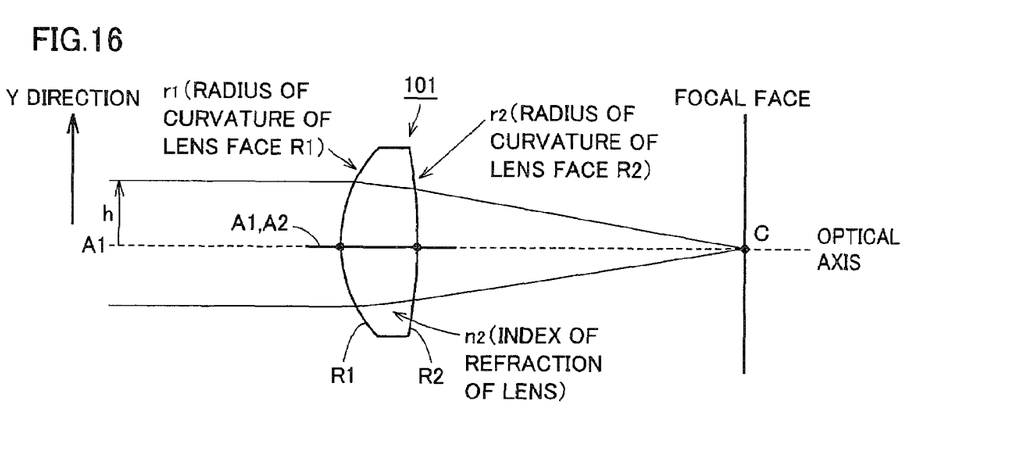
FIG. 16 shows a status of image formation in a case of no positional displacement of a lens face.

As shown in FIG. 16, if there is no positional displacement of a lens face (i.e., if an axis A1 of a lens face R1 and an axis A2 of a lens face R2 are aligned with an optical axis), first, light transmits through double convex lens 101, and then forms an image at a point C where the optical axis (a dotted line in FIG. 16) intersects a focal face.

Figure 17:
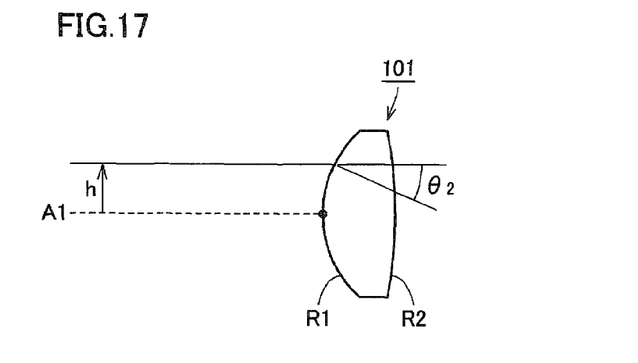
FIG. 17 shows a height h of a light beam, and an angle $\theta_2$ of outgoing light from a lens face.

As shown in FIG. 17, light with an optical axis which is parallel with axis A1 of lens face R1 enters lens face R1. In a paraxial theory (an approximation calculation), a degree of refraction of the light in lens face R1 (i.e., an angle $\theta_2$ of outgoing light from lens face R1) is expressed by the following equation (1).

$$n_2\theta_2 - n_1\theta_1 = h \times \Phi \ (\Phi = (n_2 - n_1)/r) \qquad (1)$$

In the equation (1), $n_1$ represents an index of refraction in an atmosphere, $n_2$ represents an index of refraction in lens 101, $\theta_1$ represents an angle of incoming light into lens face R1, $\theta_2$ represents an angle of outgoing light from lens face R1, h represents a height of a light beam from axis A1 of lens face R1, and r represents a radius of curvature of lens face R1.

As described above, when the light with the optical axis which is parallel with axis A1 of lens face R1 enters lens face R1, $\theta_1$ becomes 0°. Therefore, the following equation (2) is derived from the equation (1).

$$n_2\theta_2 = h \times \Phi \qquad (2)$$

The equation (2) leads to the following conclusion. That is, if each of index of refraction $n_2$ and shape (radius of curvature) r is predetermined in value as for the lens material, angle $\theta_2$ of the light refracted in lens face R1 is proportional to height h of the light beam.

Figure 18:
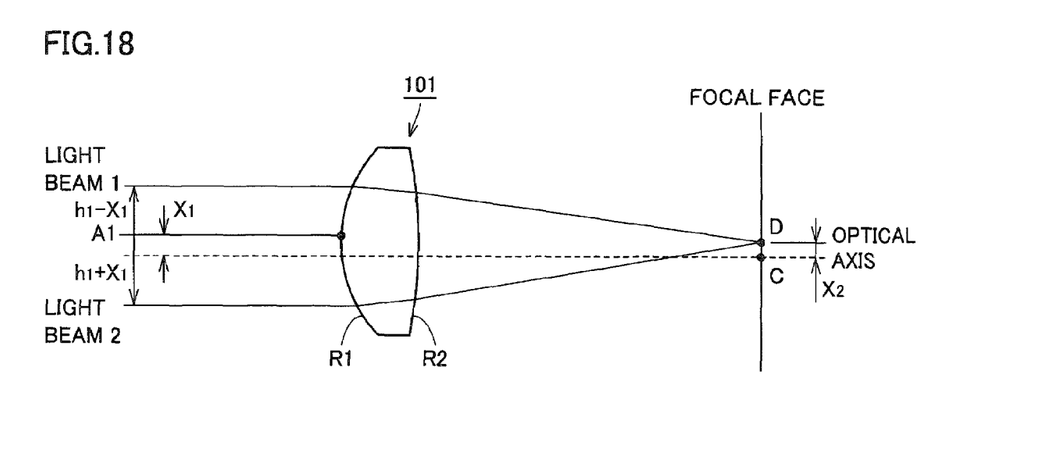
FIG. 18 shows displacement of an image formation point D in a case where a lens face R1 is displaced.

As shown in FIG. 18, if axis A1 of lens face R1 is misaligned with respect to the optical axis (a dotted line in FIG. 18) toward a light beam 1 by a distance $X_1$, a height of light beam 1 is calculated from $h_1-X_1$ while a height of a light beam 2 is calculated from $h_1+X_1$. Herein, the equation (2) also leads to the following conclusion. That is, the height of light beam 1 is small; therefore, the angle of refraction of light beam 1 in lens face R1 becomes small while the height of light beam 2 is large; therefore, the angle of refraction of light beam 2 in lens face R1 becomes large. Consequently, the light transmits through lens 101, and then forms an image at a point D which is displaced with respect to point C, where the optical axis intersects the focal face, toward light beam 1 by a distance $X_2$, which causes transmission eccentricity.

Next, description will be given of a method for correcting the transmission eccentricity with the use of lens face R2, in the case of using the double convex lens.

Figure 19:
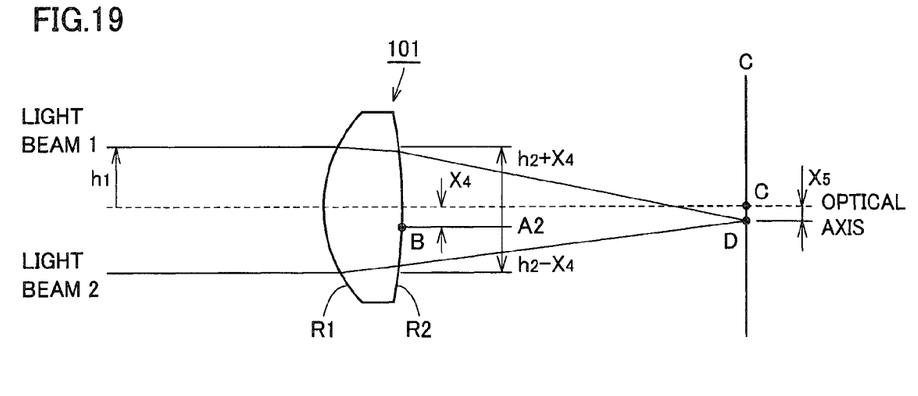
FIG. 19 shows displacement of image formation point D in a case where a lens face R2 has a convex shape and is displaced.

With reference to FIG. 19, first, consideration will be made to a case where lens face R1 is not displaced, but lens face R2 is displaced. In this case, if axis A2 of lens face R2 is displaced with respect to the optical axis (a dotted line in FIG. 19) toward light beam 2 by a distance $X_4$, the angle of refraction of light beam 1 is larger than the angle of refraction of light beam 2 in lens face R2 as described above. Consequently, the light transmits through lens 101, and then forms an image at a point D which is displaced with respect to point C, where the optical axis intersects the focal face, toward light beam 2 by a distance $X_5$.

As shown in FIG. 18, as described above, when axis A1 of lens face R1 is displaced with respect to the optical axis toward light beam 1 by distance $X_1$, axis A2 of lens face R2 is displaced with respect to the optical axis toward light beam 2 (i.e., toward a side opposite to axis A1 of lens face R1 with respect to the optical axis), so that image formation point D can be made coincident with point C where the optical axis intersects the focal face. Thus, it is possible to correct the transmission eccentricity.

Moreover, correction amount $X_4$ is calculated from the following equation: $X_4 = r_2/r_1 \times X_1$, when it is assumed that the thickness of the lens is negligibly small.

Figure 20:
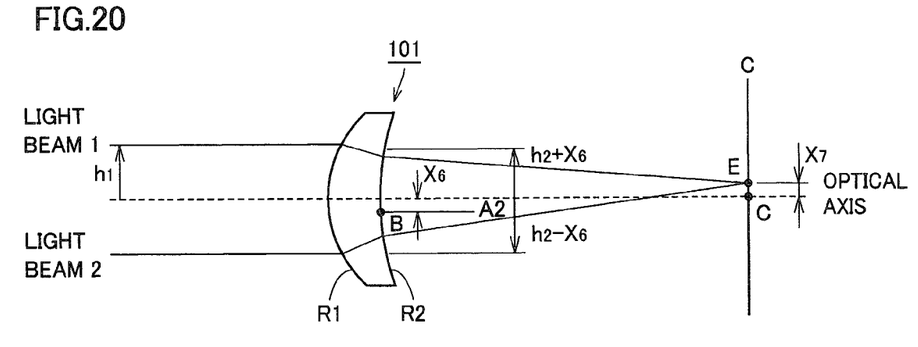
FIG. 20 shows displacement of image formation point D in a case where lens face R2 has a concave shape and is displaced.

As shown in FIG. 20, it is assumed herein that lens face R2 has a concave shape. If axis A2 of lens face R2 is displaced with respect to the optical axis (a dotted line in FIG. 20) toward light beam 2 by a distance $X_6$, the angle of refraction of light beam 1 is larger than the angle of refraction of light beam 2 in lens face R2 as described above. However, since lens face R2 is formed into the concave shape, a direction of refraction of the light beam becomes opposite to that in the case where lens face 2 has a convex shape. In the case of using concave lens face R2, consequently, an image formation point E is displaced in a direction opposite to that in the case of using convex lens face R2 (FIG. 19). Thus, the light transmits through lens 101, and then forms an image at point E which is displaced with respect to point C, where the optical axis intersects the focal face, toward light beam 1 by a distance $X_7$.

As shown in FIG. 18, as described above, when axis A1 of lens face R1 is displaced with respect to the optical axis toward light beam 1 by distance $X_1$, axis A2 of lens face R2 is displaced with respect to the optical axis toward light beam 1 (i.e., toward a side of axis A1 of lens face R1 with respect to the optical axis), so that image formation point E can be made coincident with point C where the optical axis intersects the focal face. Thus, it is possible to correct the transmission eccentricity.

Moreover, correction amount $X_6$ is calculated from an equation: $X_6 = r_2/r_1 \times X_1$, when it is assumed that the thickness of the lens is negligibly small.

As described above, it is important for suppression of transmission eccentricity to prevent positional displacement of lens face R1 having a higher ability to refract a light beam (i.e., having large power $\Phi$). This prevention of the positional displacement reduces a correction amount in another lens face.

As for the compound lens shown in FIG. 4 and the cemented lens shown in FIG. 11, the axis of resin lens 2 or the axis of lens 3 is adjusted with respect to the axis of lens face $1a_1$ of optical lens 1 or the axis of lens face $1a_2$ of optical lens 1 as described above. Thus, the transmission eccentricity can be corrected so as to be small.

Figure 21:
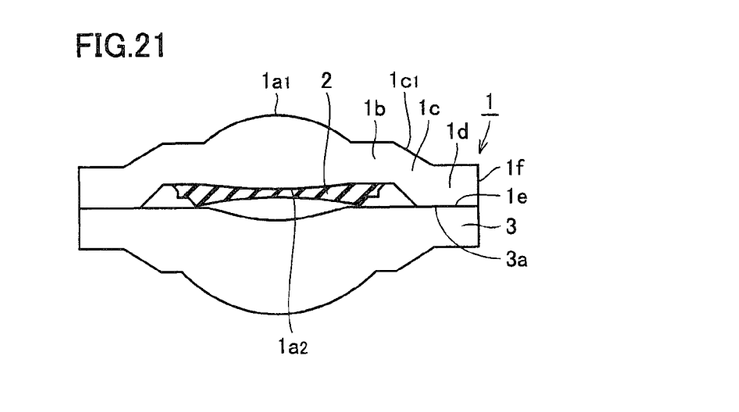
FIG. 21 is a schematic sectional view showing a configuration that both a resin lens and a lens are combined with an optical lens (a matrix lens).

In the forgoing description, one of resin lens 2 and lens 3 is combined with matrix lens (optical lens) 1. As shown in FIG. 21, alternatively, both resin lens 2 and lens 3 may be combined with matrix lens (optical lens) 1.

Figure 22:
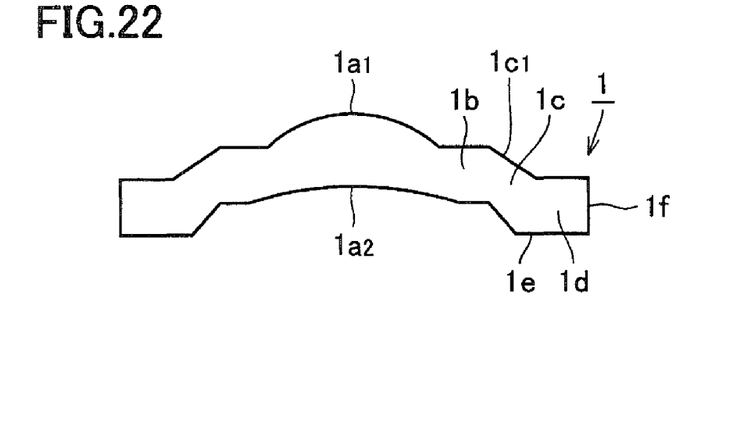
FIG. 22 is a schematic sectional view showing a configuration that the optical lens is a positive meniscus lens.
Figure 23:
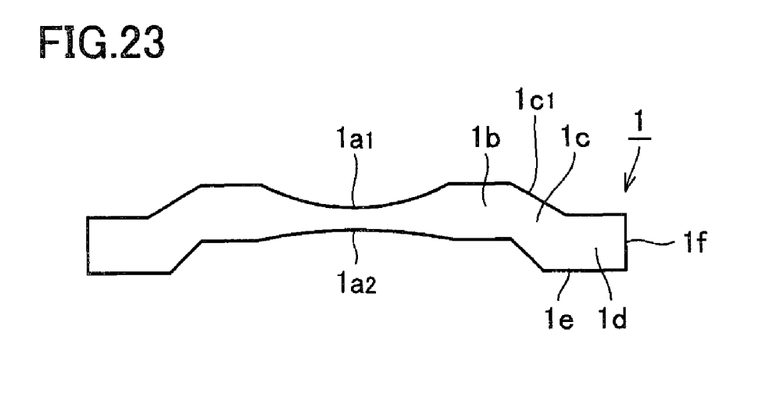
FIG. 23 is a schematic sectional view showing a configuration that the optical lens is a double concave lens.
Figure 24:
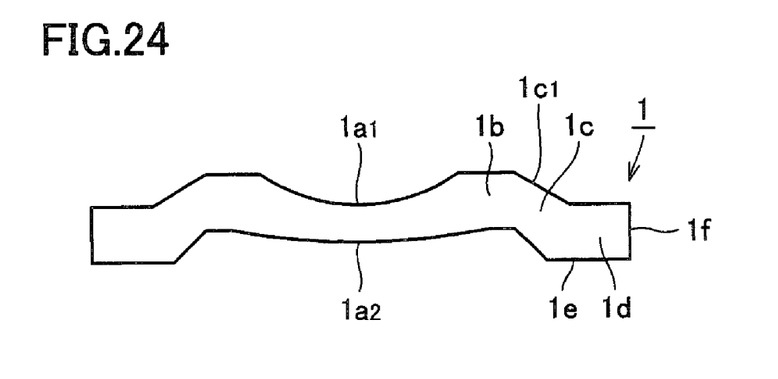
FIG. 24 is a schematic sectional view showing a configuration that the optical lens is a negative meniscus lens.

In the foregoing description, optical lens 1 is a double convex lens. Alternatively, optical lens 1 may be one of a positive meniscus lens shown in FIG. 22, a double concave lens shown in FIG. 23 and a negative meniscus lens shown in FIG. 24 as long as the radius of curvature of lens face $1a_1$ formed on the first side together with inclined face 1c, is smaller than the radius of curvature of lens face $1a_2$ formed on the second side in the lens effective portion.

Figure 25:
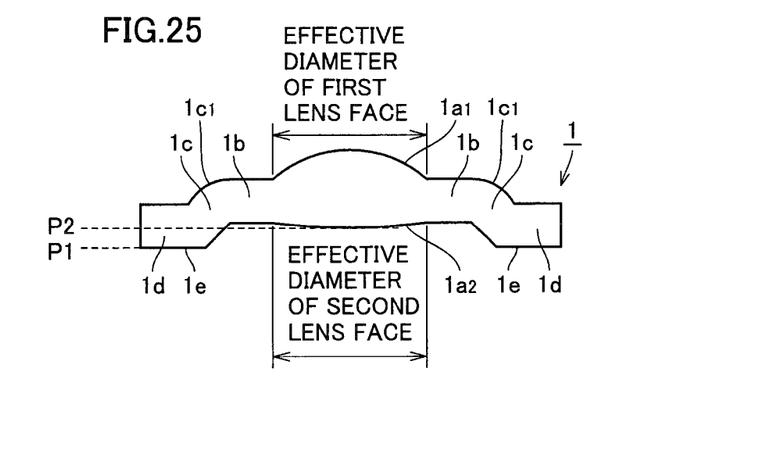
FIG. 25 is a schematic sectional view showing a configuration that the optical lens has an inclined face formed into a curved shape.

In the foregoing description, inclined face $1c_1$, is formed into a conical shape (i.e., an inclination is constant from an inner circumferential side toward an outer circumferential side). As shown in FIG. 25, alternatively, inclined face $1c_1$, may have a cross section formed into a curved shape (i.e., the inclination is changed from the inner circumferential side toward the outer circumferential side) as long as the inclination is made outwardly from the first side to the second side. As for the curved shape, moreover, inclined face $1c_1$ may be a convex curved face which protrudes outwardly as shown in FIG. 25 or may be a concave curved face which is dented inwardly.

In particular, the present invention is advantageously applicable to an optical lens which requires reduction in amount of transmission eccentricity, a compound lens and a method for producing the same, as well as a cemented lens and a method for producing the same.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An optical lens comprising:
a lens effective portion;
an inclined portion located at an outer periphery of said lens effective portion; and
a flange portion located at an outer periphery of said inclined portion, wherein
said lens effective portion has, on a first side, a first lens face with a first radius of curvature and also has, on a second side, one of a second lens face with no curvature and a second lens face with a second radius of curvature larger than said first radius of curvature,
said inclined portion has, on said first side, an inclined face inclined outwardly from said first side to said second side, and
said flange portion has, on said second side, a reference face protruding longer than said second lens face on said second side.

2. The optical lens according to claim 1, wherein said inclined portion is one of a conical face and a curved face.

3. A compound lens comprising:
the optical lens of claim 1; and
a resin lens cemented to said second lens face of said optical lens.

4. A cemented lens comprising:
the optical lens of claim 1; and
a lens cemented to said second side of said optical lens.

5. A method for producing the compound lens, comprising the steps of:
adjusting the positions of said inclined portion and said lens holding unit by bringing a lens holding unit into contact with said inclined face of said optical lens of claim 1 such that said inclined portion of said optical lens and said lens holding unit become coaxial with each other; and
molding a resin material in such a manner that said optical lens presses said resin material placed in a lens molding die against said lens molding die in a state where respective positions of said inclined portion and said lens holding unit are adjusted, and cementing the resin lens made of said resin material to said second lens face of said optical lens.

6. A method for producing the cemented lens, comprising the steps of:
adjusting the positions of said inclined portion and said lens holding unit by bringing a lens holding unit into contact with said inclined face of said optical lens of claim 1 such that said inclined portion of said optical lens and said lens holding unit become coaxial with each other; and
superimposing said optical lens on a lens placed on a lens placement unit to align said lens placement unit with said lens in a state where respective positions of said inclined portion and said lens holding unit are adjusted, and cementing said lens to said optical lens.

* * * * *